United States Patent
Wakui et al.

(10) Patent No.: US 10,781,370 B2
(45) Date of Patent: Sep. 22, 2020

(54) METHOD OF PRODUCING NITRIDE FLUORESCENT MATERIAL

(71) Applicant: NICHIA CORPORATION, Anan-shi, Tokushima (JP)

(72) Inventors: Sadakazu Wakui, Tokushima (JP); Shigeki Yoshida, Anan (JP); Shoji Hosokawa, Tokushima (JP)

(73) Assignee: NICHIA CORPORATION, Anan-shi (JP)

( * ) Notice: Subject to any disclaimer, the term of this patent is extended or adjusted under 35 U.S.C. 154(b) by 376 days.

(21) Appl. No.: 15/842,133

(22) Filed: Dec. 14, 2017

(65) Prior Publication Data

US 2018/0171221 A1 Jun. 21, 2018

(30) Foreign Application Priority Data

Dec. 15, 2016 (JP) ................. 2016-243269

(51) Int. Cl.
```
C09K 11/77    (2006.01)
C01D 13/00    (2006.01)
C01F 7/00     (2006.01)
C01B 21/06    (2006.01)
C01F 17/30    (2020.01)
```
(52) U.S. Cl.
CPC ...... C09K 11/7728 (2013.01); C01B 21/0602 (2013.01); C01D 13/00 (2013.01); C01F 7/002 (2013.01); C01F 17/30 (2020.01); C09K 11/7734 (2013.01); *C01P 2004/03* (2013.01); *C01P 2004/61* (2013.01); *C01P 2006/60* (2013.01)

(58) Field of Classification Search
CPC ................................. C09K 11/7734
See application file for complete search history.

(56) References Cited

U.S. PATENT DOCUMENTS

| 8,460,579 B2 | 6/2013 | Becker et al. |
| 2010/0096592 A1 | 4/2010 | Becker et al. |
| 2016/0115384 A1* | 4/2016 | Todorov ............. C09K 11/7734 313/503 |

FOREIGN PATENT DOCUMENTS

| JP | 2010525092 A | 7/2010 |
| JP | 2015-526532 A | 9/2015 |
| JP | 2016-136587 A | 7/2016 |
| JP | 2016-154205 A | 8/2016 |
| JP | 2016216711 A | 12/2016 |
| JP | 2017-008130 A | 1/2017 |
| WO | 2013-175336 A1 | 11/2013 |

OTHER PUBLICATIONS

Cui et al, "The synthesis of narrow-band red-emitting SrLiAl3N4:Eu2+ phoshor and improvment of its luminescence properties", Journal of Materials Chemistry C, 2016, 4, Jul. 11, 2016, pp. 7332-7350.*
Cui, D. The synthesis of narrow-band red-emitting SrLiAl$_3$N4:Eu$^2$+ phosphor and improvement of its luminescence properties, Journal of Materials Chemistry C, vol. 4, (Jul. 11, 2016), pp. 7332-7338.
Philipp Pust et al., "Narrow-band red-emitting Sr[LiAl3N4]:Eu2+ as a next-generation LED-phosphor material" Nature Materials, NMAT4012, vol. 13 Sep. 2014.

* cited by examiner

*Primary Examiner* — C Melissa Koslow
(74) *Attorney, Agent, or Firm* — Hunton Andrews Kurth LLP

(57) ABSTRACT

Provided is a production method of a nitride fluorescent material capable of producing a nitride fluorescent material having a higher emission intensity. The production method is for producing a nitride fluorescent material having a composition containing at least one element $M^a$ selected from the group consisting of Sr, Ca, Ba and Mg, at least one element $M^b$ selected from the group consisting of Li, Na and K, at least one element $M^c$ selected from the group consisting of Eu, Ce, Tb and Mn, and Al and N, which includes subjecting a raw material mixture containing elements constituting the composition of the nitride fluorescent material, along with $SrF_2$ and/or LiF added thereto as a flux, to a heat treatment, wherein the amount of the flux is in a range of 5.0% by mass or more and 15% by mass or less relative to the total amount, 100% by mass of the raw material mixture and the flux.

17 Claims, 5 Drawing Sheets

METHOD OF PRODUCING NITRIDE FLUORESCENT MATERIAL

CROSS-REFERENCE TO RELATED PATENT APPLICATION

The present application claims priority under 35 U.S.C. § 119 to Japanese Patent Application No. 2016-243269, filed Dec. 15, 2016, the entire disclosures of which are hereby incorporated herein by references in its entirely.

BACKGROUND

Technical Field

The present disclosure relates to a method of producing a nitride fluorescent material.

Description of Related Art

Light-emitting devices including combinations of a light emitting diode (hereinafter may be referred to as "LED") and a fluorescent material have been increasingly applied as lighting apparatuses, backlights for liquid crystal displays, compact strobes, etc. For example, in the case where such light emitting devices are used in a liquid crystal display, a fluorescent material having a narrow full width at half maximum is desired to provide a wider range of color reproducibility.

Examples of such a fluorescent material include a red light-emitting phosphor of $SrLiAl_3N_4$:Eu (hereinafter may be referred to as "SLAN phosphor"). For example, International Unexamined Patent Publication No. WO2013/175336 and Non-Patent Literature 1 (Philipp Pust et al. "Narrow-band red-emitting $Sr[LiAl_3N_4]$:$Eu^{2+}$ as a next-generation LED-phosphor material" Nature Materials, NMAT4012, VOL13 Sep. 2014) disclose SLAN phosphors having a narrow full width at half maximum of 70 nm or less and having an emission peak fluorescence wavelength near 650 nm.

As disclosed in Non-Patent Literature 1, a SLAN phosphor is, for example, produced such that powder of raw materials including lithium aluminum hydride ($LiAlH_4$), aluminum nitride (AlN), strontium hydride ($SrH_2$), and europium fluoride ($EuF_3$) is weighed in a stoichiometric ratio so that Eu is 0.4 mol % and mixed. The mixture is placed in a crucible and calcined in a mixed gas atmosphere of hydrogen and nitrogen under atmospheric pressure at a temperature of 1,000° C. for two hours.

SUMMARY

However, the SLAN phosphors disclosed still have room for further improvement in the light emission intensity. Accordingly, an object of one aspect of the present invention is to provide a method of producing a nitride fluorescent material having a high emission intensity.

The means for solving the above-mentioned problems are as follows.

A first embodiment of the present disclosure is a method of producing a nitride fluorescent material having a composition containing at least one element $M^a$ selected from the group consisting of Sr, Ca, Ba and Mg, at least one element $M^b$ selected from the group consisting of Li, Na and K, at least one element $M^c$ selected from the group consisting of Eu, Ce, Tb and Mn, and Al and N, including subjecting a raw material mixture containing the elements constituting the composition of the nitride fluorescent material, along with $SrF_2$ and/or LiF added thereto as a flux, to a heat treatment, wherein the amount of the flux is 5.0% by mass or more and 15% by mass or less relative to the total mass amount of the raw material mixture and the flux.

DETAILED DESCRIPTION

Figure 1:
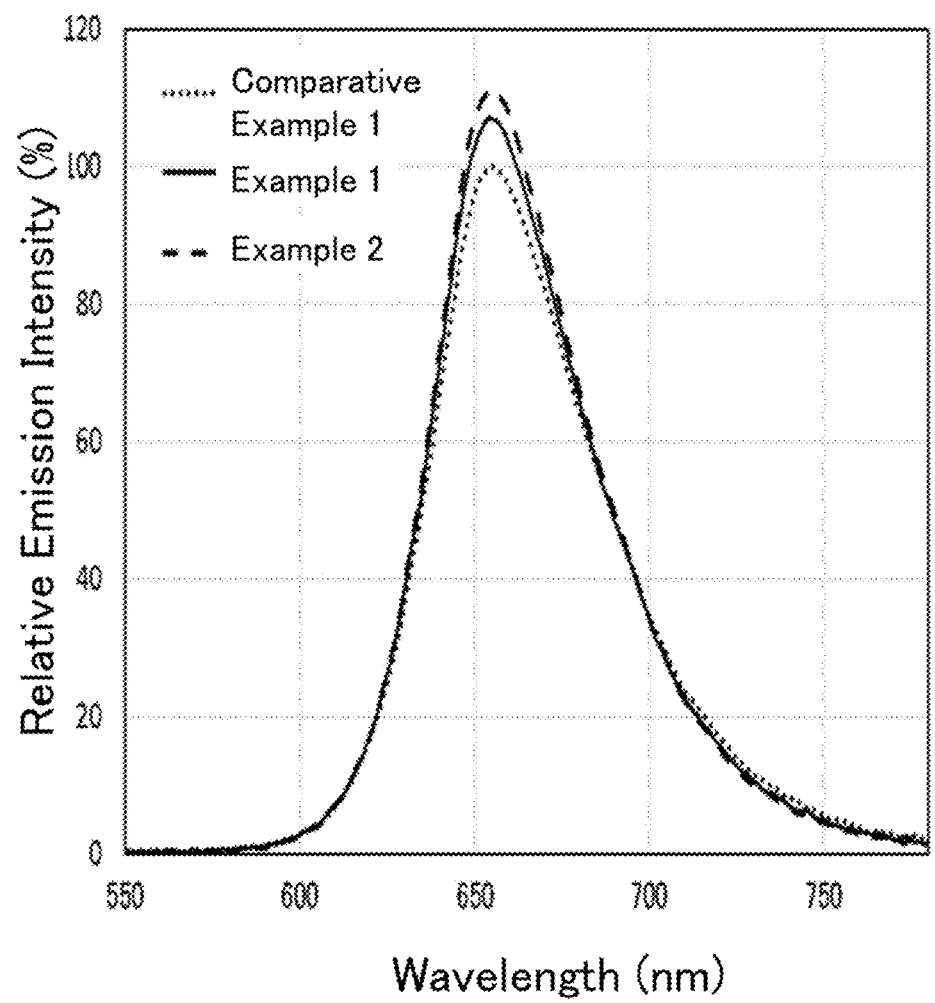
FIG. 1 shows light emission spectra of nitride fluorescent materials of Example 1, Example 2 and Comparative Example 1.

A method of producing a nitride fluorescent material of the present disclosure will be described in conjunction with illustrated embodiments. The embodiments described below are intended as illustrative of a method of producing a nitride fluorescent material to give a concrete form to technical ideas of the present invention, and the scope of the invention is not limited to the method of producing a nitride fluorescent material described below. The relation between the color names and the chromaticity coordinates and the relation between the ranges of wavelength of light and the color names of single color light and the like conform to JIS Z8110.

Method of Producing Nitride Fluorescent Material

The method of producing a nitride fluorescent material of the present disclosure (hereinafter may be referred to as "the present production method") is a method of producing a nitride fluorescent material having a composition containing at least one element $M^a$ selected from the group consisting of Sr, Ca, Ba and Mg, at least one element $M^b$ selected from the group consisting of Li, Na and K, at least one element $M^c$ selected from the group consisting of Eu, Ce, Tb and Mn, and Al and N, which includes subjecting a raw material mixture containing the elements constituting the composition of the nitride fluorescent material, along with $SrF_2$ and/or LiF added thereto as a flux, to a heat treatment, wherein the amount of the flux is in a range of 5.0% by mass or more and 15% by mass or less relative to the total amount, 100% by mass of the raw material mixture and the flux. In the present production method, the amount of the flux, $SrF_2$ and/or LiF to be added is more preferably 6.0% by mass or more relative to the total amount, 100% by mass of the raw material mixture and the flux, even more preferably 7.0% by mass or more, still more preferably 8.0% by mass or more, and especially more preferably 9.0% by mass or more.

Flux

In the present production method, the raw material mixture containing the elements constituting the composition of a nitride fluorescent material is heat-treated along with a specific amount of $SrF_2$ and/or LiF added thereto as a flux to promote the reaction of the raw materials in the mixture to secure more uniform progression of solid-phase reaction thereby producing a nitride fluorescent material having a specific composition and having a higher emission intensity. This may be considered because the temperature of the heat treatment of the raw material mixture could be nearly the same as the temperature of the formation of the liquid phase of $SrF_2$ and/or LiF used as a flux, and therefore the reaction of the raw material mixture could be thereby accelerated.

The nitride fluorescent material obtained according to the present production method preferably contains at least Sr as the element $M^a$ and at least Li as the element $M^b$ among the elements constituting the composition of the nitride fluorescent material. Preferably, the flux is a fluoride that contains the same element as at least one element contained in the composition constituting the nitride fluorescent material. In the elements constituting the composition of the nitride fluorescent material, when the element $M^a$ contains at least Sr and when the element $M^b$ contains at least Li, and when a specific amount of $SrF_2$ and/or LiF is used as a flux, the impurities in the obtained fluorescent material can be reduced and the reactivity of the raw materials are promoted more uniformly to give a nitride fluorescent material having a higher emission intensity.

In the present production method, when the amount of $SrF_2$ and/or LiF as a flux is less than 5.0% by mass relative to the total amount, 100% by mass of the raw material mixture and the flux, the reaction of the raw materials in the mixture could not be sufficiently promoted, and therefore crystal growth is insufficient and the emission intensity may decrease. When the amount of $SrF_2$ and/or LiF as a flux is more than 15% by mass relative to the total amount, 100% by mass of the raw material mixture and the flux, the reaction may proceed too much and the formed fluorescent particles may be further molted and the particles may be sintered together to give a large amount of hard and coarse particles. Even after grinding, the resultant hard and coarse particles would have a non-uniform particle size. In the case where a nitride fluorescent material having a non-uniform particle size is used in a light-emitting device, it may cause color unevenness and the device could not provide a good color tone.

The nitride fluorescent material obtained according to the present production method (may be referred to as "the present nitride fluorescent material") preferably has a composition represented by the following formula (I):

$$M^a{}_wM^b{}_xEu_yAl_3N_z \qquad (I)$$

wherein $M^a$ is at least one element selected from the group consisting of Sr, Ca, Ba, and Mg; $M^b$ is at least one element selected from the group consisting of Li, Na, and K; and w, x, y, and z each are numbers satisfying $0.8 \leq w < 1.1$, $0.5 \leq x \leq 1.8$, $0.001 < y \leq 0.1$, and $1.5 \leq z \leq 5.0$. In the above formula (I) representing the present nitride fluorescent material, the element $M^a$ preferably contains at least Sr, and the element $M^b$ preferably contains at least Li.

A parameter w and a parameter x in the above formula (I) each indicate the compositional ratio (molar ratio) of the elements constituting the skeleton of the host crystal contained in the present nitride fluorescent material. Regarding the parameter w and the parameter x in the formula (I), the parameter w is, from the viewpoint of stability of the crystal structure, preferably in a range of 0.8 or more and less than 1.1, and the parameter x is preferably in a range of 0.5 or more and 1.8 or less. In the case where LiF is used as a flux, the molar ratio (the parameter x) of Li contained in the composition of the present nitride fluorescent material may be 1.8. A parameter y is an Eu activation amount, and may be adequately selected so as to attain the desired properties. The parameter y preferably satisfies $0.001 < y \leq 0.1$, more preferably $0.001 < y \leq 0.02$, even more preferably $0.002 \leq y \leq 0.015$. A parameter z, from the viewpoint of stability of the crystal structure, preferably satisfies $1.5 \leq z \leq 5.0$, more preferably $2.0 \leq z \leq 4.0$.

Even in the case where the present nitride fluorescent material is represented by the formula (I), a minor amount of an element other than the elements constituting the composition represented by the formula (I) may be contained in the present nitride fluorescent material owing to impurities that may be contained in the raw materials used. The element that may exist in the present nitride fluorescent material includes at least one element selected from the group consisting of Sc, Y, Ti, Zr, V, Nb, Cr, Mo, Mn, Fe, Ru, Sm, Gd, Tb, Dy, Ho, Er, Tm, Yb, Hf, Ta, W, Re, Os, Ir, Pt, Tl, Pb and Bi. A minor amount of the element that may be present in the nitride fluorescent material may exist in the material in a unit of less than 100 ppm, and typically the element may exist in a unit of a few ppm to tens of ppm.

In addition, as the case may be, the present nitride fluorescent material may contain an element of fluorine (F) or oxygen (O) as an element that is not shown in the composition of the formula (I) as its amount is infinitesimal and that may be scarcely incorporated in the crystal structure of the host crystal of the nitride fluorescent material. Fluorine (F) and oxygen (O) are not elements that constitute the crystal structure contained in the nitride fluorescent material but are considered to be elements derived from deposits such as oxides adhering to the nitride fluorescent material. Fluorine contained in the nitride fluorescent material is considered to be fluorine derived from a fluoride used as a raw material or $SrF_2$ and/or LiF used as a flux. Fluorine and/or oxygen existing in the nitride fluorescent material may be in a unit of less than 100 ppm, and typically may be in a unit of a few ppm to tens of ppm.

Raw Material Mixture

The raw material mixture for use in the present production method contains, as raw materials, plural kinds of compounds each containing one or more kinds of elements constituting the composition of the present nitride fluorescent material, and may contain, as a whole of the raw material mixture, all elements constituting the composition of the present nitride fluorescent material.

For example, each raw material may contain one or more elements selected from the group consisting of the metal elemental substances of the metal elements constituting the composition of the present nitride fluorescent material and metal compounds thereof. Such metal compounds include hydrides, nitrides, fluorides, oxides, carbonates, chlorides, etc. The raw material is, from the viewpoint of improving emission properties, preferably at least one selected from the group consisting of hydrides, nitrides and fluorides. When the raw material mixture contains oxides, carbonates, chlorides as metal compounds, the content thereof is preferably 5% by mass or less in the raw material mixture, more preferably 1% by mass or less. Among metal compounds, fluorides may be added to the raw material mixture as a compound that may make the cation elemental ratio to be in the intended range, and may have an effect of flux.

The compound containing the element $M^a$ is a metal elemental substance represented by at least one element $M^a$ selected from the group consisting of Sr, Ca, Ba and Mg, or a metal compound containing the element $M^a$ (hereinafter may be referred to as "first metal compound"). The first metal compound is preferably a compound containing at least Sr, in which a part of Sr may be substituted with Ca, Mg, Ba. The compound may control the emission peak wavelength of the nitride fluorescent material.

Specifically, the first metal compound includes $SrN_2$, SrN, $Sr_3N_2$, $SrH_2$, $SrF_2$, $Ca_3N_2$, $CaH_2$, $CaF_2$, $Ba_3N_2$, $BaH_2$, $BaF_2$, $Mg_3N_2$, $MgH_2$, $MgF_2$, and at least one selected from the group is preferred. In the case where $SrF_2$ is used as a raw material, it may function also as a flux. As the first metal compound, an imide compound, an amide compound may also be used. One alone or two or more kinds of first metal compounds may be used either singly or as combined.

The compound containing the element $M^b$ is a metal compound containing a metal elemental substance represented by one element $M^b$ selected from the group consisting of Li, Na and K, or a metal compound containing the element $M^b$ (hereinafter may be referred to as "second metal compound"). The second metal compound preferably contains at least Li, and is more preferably at least one of a nitride and a hydride with Li. When the second metal compound contains Li, a part of Li may be substituted with Na, K, and may contain any other metal element constituting the nitride fluorescent material. Specifically, the Li-containing second metal compound is preferably at least one selected from the group consisting of $Li_3N$, $LiN_3$, LiH and $LiAlH_4$. One alone or two or more kinds of second metal compounds may be used either singly or as combined.

The compound containing the element $M^c$ is a metal compound containing a metal elemental substance represented by one element $M^c$ selected from the group consisting of Eu, Mn, Tb and Ce, or a metal compound containing the element $M^c$ (hereinafter may be referred to as "third metal compound"). The metal elemental substance represented by the element $M^c$ may be a metal elemental substance substantially containing an element alone selected from the group consisting of Eu, Mn, Tb and Ce, or an alloy partly substituted with any other metal. The third metal compound preferably contains Eu, and a part of Eu may be substituted with Sc, Y, La, Ce, Pr, Nd, Sm, Gd, Tb, Dy, Ho, Er, Tm, Yb, Lu, etc. The other element substituting for a part of Eu is considered to act as a co-activator. Using a co-activator, the emission properties of the nitride fluorescent material may be controlled. In the case where a raw material mixture containing Eu is used as a raw material for the nitride fluorescent material, the blend ratio may be varied as needed. Europium mainly has divalent and trivalent energy levels. Preferably, the nitride fluorescent material uses at least $Eu^{2+}$ as an activator. Specifically, the Eu-containing metal compound for the third metal compound is at least one selected from the group consisting of $Eu_2O_3$, EuN and $EuF_3$. In the case where the nitride fluorescent material contains a divalent Eu as the emission center thereof, the divalent Eu may be readily oxidized, and therefore in the case, a raw material mixture may be prepared using a metal compound containing a trivalent Eu.

The Al-containing compound is a metal elemental substance of aluminium (Al) or a metal compound containing Al. The Al-containing compound may be a metal compound containing Al alone but not containing any other metal. The compound may be a metal compound in which a part of Al is substituted with a metal element selected from the group consisting of Ga and In of Group-13 elements, and V, Cr, Co of Period-4 elements, or may be a metal compound containing any other metal element constituting the nitride fluorescent material such as Li in addition to Al. Specifically, the Al-containing metal compound is preferably one selected from the group consisting of AlN, $AlH_3$, $AlF_3$ and $LiAlH_4$. One alone or two or more kinds of Al-containing compounds may be used either singly or as combined.

Heat Treatment

The present production method includes adding $SrF_2$ and/or LiF as a flux to the raw material mixture and heat-treating the resultant. The amount of the flux is in a range of 5.0% by mass or more and 15% by mass or less relative to 100% by mass of the total amount of the raw material mixture and the flux.

In the present production method, the temperature for the heat treatment may be in a range of 1,000° C. or higher and 1,400° C. or lower, but is preferably in a range of 1,000° C. or higher and 1,300° C. or lower, more preferably in the range of 1,100° C. or higher and 1,300° C. or lower. When the heat treatment temperature is in the range of 1,000° C. or higher and 1,400° C. or lower, the nitride fluorescent material having the intended composition is easy to produce. When the heat treatment temperature is in the range of 1,000° C. or higher and 1,300° C. or lower, the synthesized fluorescent material can be prevented from being partly decomposed to worsen the emission properties thereof, and a nitride fluorescent material having a higher emission intensity can be produced. The heat treatment may be a two-stage heat treatment (multistage heat treatment) where a first-stage heat treatment is carried out in a range of 800° C. or higher and 1,000° C. or lower, then the system is gradually heated, and a second-stage heat treatment is carried out in the range of 1,000° C. or higher and 1,400° C. or lower.

In the present production method, the atmosphere for the heat treatment is preferably an atmosphere containing a nitrogen gas. The nitrogen gas-containing atmosphere may be an atmosphere containing at least one selected from the group consisting of hydrogen, argon, carbon dioxide, carbon monoxide, ammonia, in addition to nitrogen gas. The ratio of the nitrogen gas in the atmosphere for the heat treatment is preferably 70% by volume or more, more preferably 80% by volume or more.

In the present production method, the pressure for the heat treatment is preferably an increased pressure in a range of 0.2 MPa or more and 200 MPa or less as a gauge pressure. The nitride fluorescent material may readily decompose at a higher temperature, but in an increased-pressure atmosphere, the decomposition may be suppressed, and a higher emission intensity can be attained. The pressure for the increased-pressure atmosphere is more preferably, as a gauge pressure, in a range of 0.2 MPa or more and 1.0 MPa or less, even more preferably in a range of 0.8 MPa or more and 1.0 MPa or less.

The heat treatment time may be adequately selected depending on the heat treatment temperature, the gas pressure, etc. The heat treatment time is, for example, in a range of 0.5 hours or more and 20 hours or less, preferably in a range of 1 hour or more and 10 hours or less.

As an apparatus for the heat treatment, for example, a gas-pressurized electric furnace may be used. For the heat treatment of the raw material mixture, a crucible, a boat and others made of a carbon material such as graphite, or a boron nitride (BN) material, an alumina ($Al_2O_3$), W or Mo material may be used.

Next, as one example of the present production method, a method of producing a nitride fluorescent material having a composition represented by $Sr_{0.993}LiEu_{0.007}Al_3N_4$ as the intended compositional ratio (molar ratio) is described specifically.

Powders of $SrN_u$ (corresponding to u=⅔, mixture of $SrN_2$ and SrN), $LiAlH_4$, AlN and $EuF_3$ were used as metal compounds to constitute a raw material mixture. These were metered in an inert atmosphere in a glove box so as to be in a ratio of Sr:Li:Eu:Al=0.993:1.2:0.007:3. These powders were mixed to give a raw material mixture. Here, Li readily scatters during calcining, and was therefore incorporated more than in a theoretical compositional ratio.

As a flux, $SrF_2$ and/or LiF are/is added to the raw material mixture and heat-treated in an atmosphere containing a nitrogen gas. The heat treatment may be carried out, for example, using a gas-pressurized electric furnace. The heat treatment temperature is within a range of 1,000° C. or higher and 1,400° C. or lower. As a result of the heat treatment, particles of a nitride fluorescent material having a composition represented by $Sr_{0.993}Li_{1.000}Eu_{0.007}Al_3N_4$ can be obtained. However, the ratio of the elements in the compositional formula is a theoretical compositional ratio estimated from the blending ratio of the raw material mixture. Though not shown in the compositional formula, the actual nitride fluorescent material may contain a minor amount of fluorine (F) and oxygen (O) as the case may be, as described above. The compositional ratio (molar ratio) of Sr, Li and Eu in the compositional formula is a value calculated on the basis of the compositional ratio (molar ratio) of Al, which is 3. As the case may be, the compositional ratio (molar ratio) of Sr, Li and Eu in the raw materials may differ from the theoretical compositional ratio, since the elements may scatter or the crystal structure having the intended composition may decompose during heat treatment. By varying the blending ratio of the raw materials, a nitride fluorescent material having an intended compositional ratio (molar ratio) can be obtained.

Grinding

The present production method may include grinding the heat-treated product after the heat treatment. Examples of the grinding machine include a dry-process grinding machine such as a ball mill, a vibrational mill, a hammer mill, a roll mill, a jet mill, etc. For grinding, the heat-treated product may be ground using a mortar and a pestle, etc.

Classification

The present production method may include classification of the heat-treated product after the heat treatment, and may include classification of the heat-treated product after grinding. Through classification, the average particle diameter of the resultant nitride fluorescent material may be a predetermined value or more, and a nitride fluorescent material having good excitation light absorption and having a higher emission intensity can be obtained. Specifically, classification includes screening, precipitation classification by gravity in solution, and centrifugation.

Nitride Fluorescent Material

The present nitride fluorescent material has a composition containing at least one element $M^a$ selected from the group consisting of Sr, Ca, Ba and Mg, at least one element $M^b$ selected from the group consisting of Li, Na and K, at least one element $M^c$ selected from the group consisting of Eu, Ce, Tb and Mn, and Al and N. Preferably, the present nitride fluorescent material has a composition represented by the above-mentioned formula (I). Also preferably, in the formula (I) of the present nitride fluorescent material, the element $M^a$ contains at least Sr and the element $M^b$ contains at least Li.

In this description, the average particle diameter of the nitride fluorescent material is a particle diameter (D50: median diameter) measured with a laser diffraction particle size distribution analyzer (for example, MASTER SIZER 2000 manufactured by Malvern Instruments Ltd.), at which the volume cumulative frequency from the small grain size side reaches 50%.

The average particle diameter of the present nitride fluorescent material is preferably 4.0 μm or more, more preferably 4.5 μm or more, even more preferably 5.0 μm or more, and is preferably 30 μm or less, more preferably 25 μm or less. The present nitride fluorescent material having an average particle diameter of a predetermined value or more secures improved emission efficiency. The nitride fluorescent material having an average particle diameter of a predetermined value or less secures improved processability in a process of producing a light-emitting device using it.

Preferably, the present nitride fluorescent material has a narrow particle size distribution. Having a narrow particle size distribution, the nitride fluorescent material can prevent color unevenness and can provide a light-emitting device that enables good color presentation.

Preferably, the present nitride fluorescent material has a crystal structure in a major part of particles thereof. For example, a glass material (amorphous material) has a loose crystal structure, and therefore the component ratio in the fluorescent material is not constant, which may cause chromaticity unevenness. Consequently, to prevent this, the reaction conditions in the production process must be strictly uniformly controlled. A fluorescent material having a crystal structure in a major part of crystals thereof is easy to produce and work with. In addition, a fluorescent material having a crystal structure in a major part of crystals thereof is easy to uniformly disperse in resin, and therefore a fluorescent member containing a sealant resin and a fluorescent material is easy to form. The fluorescent member is a member to cover a light-emitting element to be an excitation light source in a light-emitting device. The content of the crystal structure in fluorescent material particles indicates the proportion of the light-emitting crystal phase therein. The present nitride fluorescent material preferably has a crystal phase of at least 50% by mass or more, more preferably 80% by mass or more. When having a light-emitting crystal phase in a ratio of 50% by mass or more, the fluorescent material secures practical light emission.

The present nitride fluorescent material absorbs light having a wavelength range of 400 nm or more and 570 nm or less, which is a short wavelength-side range of visible light from ultraviolet light, and, as shown in FIG. 1, emits fluorescence having an emission peak wavelength in a wavelength range of 630 nm or more and 670 nm or less. The full width at half maximum of the emission spectrum of the present nitride fluorescent material is within a range of 45 nm or more and 65 nm or less. Using an excitation light source in a wavelength range of 400 nm or more and 570 nm or less, the emission efficiency of the fluorescent material can be improved. As the excitation light source, preferably, one having a main emission peak wavelength in a range of 420 nm or more and 500 nm or less is preferred, and one having a main emission peak wavelength in a range of 420 nm or more and 460 nm or less is more preferred.

EXAMPLES

Hereinunder, the present invention is described more specifically with reference to examples, but the present invention is not limited to these examples.

Example 1

This is to obtain a nitride fluorescent material having a composition represented by $M^a{}_wM^b{}_xEu_yAl_3N_z$, where $M^a$ is Sr, and $M^b$ is Li. Compounds of $SrN_u$ (corresponding to $u=\frac{2}{3}$, mixture of $SrN_2$ and SrN), $LiAlH_4$, AlN, and $EuF_3$ were used as raw materials. The raw materials were metered in a glove box in an inert atmosphere to be in a raw material molar ratio of Sr:Li:Eu:Al=0.993:1.2:0.007:3, and mixed to give a raw material mixture. As a flux, SrF$_2$ was added to the raw material mixture in an amount of 5% by mass relative to 100% by mass of the total amount of the raw material mixture and the flux. The raw material molar ratio is a compositional ratio (molar ratio) of the intended nitride fluorescent material. Li may readily scatter during calcination, and therefore incorporated in an amount larger than the intended compositional ratio thereof. The raw material mixture and the flux were charged in a crucible, and in a nitrogen gas atmosphere under a vapor pressure of 0.92 MPa as a gauge pressure (1.02 MPa as an absolute pressure), heat-treated at a temperature of 1,100° C. for 3 hours to give nitride fluorescent material particles. Subsequently, these were ground and classified to give a nitride fluorescent material.

Table 1 shows the compounds contained in the raw material mixture and the flux used in Examples and Comparative Examples, and the amount of the flux added (% by mass).

Example 2

Nitride fluorescent material particles were produced in the same manner as in Example 1 except that, as a flux, SrF$_2$ was added to the raw material mixture in an amount of 10% by mass relative to 100% by mass of the total amount of the raw material mixture and the flux.

Example 3

Nitride fluorescent material particles were produced in the same manner as in Example 1 except that, as a flux, LiF was added to the raw material mixture in an amount of 5% by mass relative to 100% by mass of the total amount of the raw material mixture and the flux.

Example 4

Nitride fluorescent material particles were produced in the same manner as in Example 1 except that, as a flux, LiF was added to the raw material mixture in an amount of 10% by mass relative to 100% by mass of the total amount of the raw material mixture and the flux.

Example 5

Nitride fluorescent material particles were produced in the same manner as in Example 1 except that, for obtaining a nitride fluorescent material having a composition represented by $M^a{}_w M^b{}_x Eu_y Al_3 N_z$ where $M^b$ is Li, LiH was used as a raw material, and as a flux, LiF was added to the raw material mixture in an amount of 5% by mass relative to 100% by mass of the total amount of the LiH-containing raw material mixture and the flux.

Example 6

Nitride fluorescent material particles were produced in the same manner as in Example 5 except that, as a flux, LiF was added to the raw material mixture in an amount of 10% by mass relative to 100% by mass of the total amount of the raw material mixture and the flux.

Example 7

Nitride fluorescent material particles were produced in the same manner as in Example 5 except that, as a flux, LiF was added to the raw material mixture in an amount of 15% by mass relative to 100% by mass of the total amount of the raw material mixture and the flux.

Comparative Example 1

Nitride fluorescent material particles were produced in the same manner as in Example 1 except that SrF$_2$ was not added to the raw material mixture.

Comparative Example 2

Nitride fluorescent material particles were produced in the same manner as in Example 5 except that, for obtaining a nitride fluorescent material having a composition represented by $M^a{}_w M^b{}_x Eu_y Al_3 N_z$ where $M^b$ is Li, LiH was used as a raw material, but LiF was not added to the LiH-containing raw material mixture.

Comparative Example 3

Nitride fluorescent material particles were produced in the same manner as in Example 5 except that, for obtaining a nitride fluorescent material having a composition represented by $M^a{}_w M^b{}_x Eu_y Al_3 N_z$ where $M^b$ is Li, LiH was used as a raw material, and as a flux, 2.5% by mass of SrF$_2$ was added to the LiH-containing raw material mixture.

Comparative Example 4

Nitride fluorescent material particles were produced in the same manner as in Example 5 except that, for obtaining a nitride fluorescent material having a composition represented by $M^a{}_w M^b{}_x Eu_y Al_3 N_z$ where $M^b$ is Li, LiH was used as a raw material, and as a flux, 5% by mass of SrCl$_2$ was added to the LiH-containing raw material mixture.

Comparative Example 5

Nitride fluorescent material particles were produced in the same manner as in Example 5 except that, for obtaining a nitride fluorescent material having a composition represented by $M^a{}_w M^b{}_x Eu_y Al_3 N_z$ where $M^b$ is Li, LiH was used as a raw material, and as a flux, 5% by mass of LiCl was added to the LiH-containing raw material mixture.

Comparative Example 6

Nitride fluorescent material particles were produced in the same manner as in Example 5 except that, for obtaining a nitride fluorescent material having a composition represented by $M^a{}_w M^b{}_x Eu_y Al_3 N_z$ where $M^b$ is Li, LiH was used as a raw material, and as a flux, 20% by mass of LiF was added to the LiH-containing raw material mixture.

Comparative Example 7

Nitride fluorescent material particles were produced in the same manner as in Example 5 except that, for obtaining a nitride fluorescent material having a composition represented by $M^a{}_w M^b{}_x Eu_y Al_3 N_z$ where $M^b$ is Li, LiH was used as a raw material, and as a flux, 5% by mass of BaF$_2$ was added to the LiH-containing raw material mixture.

Comparative Example 8

Nitride fluorescent material particles were produced in the same manner as in Example 5 except that, for obtaining a nitride fluorescent material having a composition represented by $M^a{}_w M^b{}_x Eu_y Al_3 N_z$ where $M^b$ is Li, LiH was used as a raw material, and as a flux, 5% by mass of $CaF_2$ was added to the LiH-containing raw material mixture.

Evaluation

Average Particle Diameter

The average particle diameter of the resultant nitride fluorescent material was measured, using a laser diffraction particle size distribution analyzer (MASTER SIZER 2000 manufactured by Malvern Instruments Ltd.). In this description, the average particle diameter of the nitride fluorescent material is a particle diameter (D50: median diameter) at which the volume cumulative frequency from the small grain size side reaches 50%.

Emission Properties

The resultant nitride fluorescent materials were measured for emission properties. The emission properties of the powder of the nitride fluorescent materials were measured with a spectrofluorophotometer: QE-2000 (manufactured by Otsuka Electronics Co., Ltd.) with excitation light having a wavelength of 450 nm. From the resultant emission spectrum, the relative emission intensity Ip (%), the emission peak wavelength λp (nm) and the full width at half maximum FWHM (nm) were determined. The results of the relative emission intensity Ip (%) of the nitride fluorescent materials of Examples and Comparative Examples are shown in Table 1. The emission peak wavelength λp (nm) in Examples was within a range of 650 nm to 655 nm, and the emission peak wavelength λp (nm) in Comparative Examples was within a range of 650 nm to 660 nm. The full width at half maximum FWHM (nm) of the nitride fluorescent materials of Examples and Comparative Examples was within a range of 50 nm to 55 nm. The relative emission intensity Ip (%) was calculated based on that of the nitride fluorescent material of Comparative Example 1 (100%). FIG. 1 shows emission spectra of the nitride fluorescent materials obtained in Example 1, Example 2 and Comparative Example 1.

Compositional Analysis

The resultant nitride fluorescent materials were subjected to compositional analysis with an inductively coupled plasma emission spectrometer (manufactured by Perkin-Elmer Corporation) by ICP emission spectrometry, thereby determining the compositional ratio (molar ratio) of the elements Sr, Li, Eu, Al and N. The results are shown in Table 2. The compositional ratio (molar ratio) of each element is a value calculated on the basis of the compositional ratio (molar ratio) of Al, which is 3.

SEM Micrograph

Figure 2:
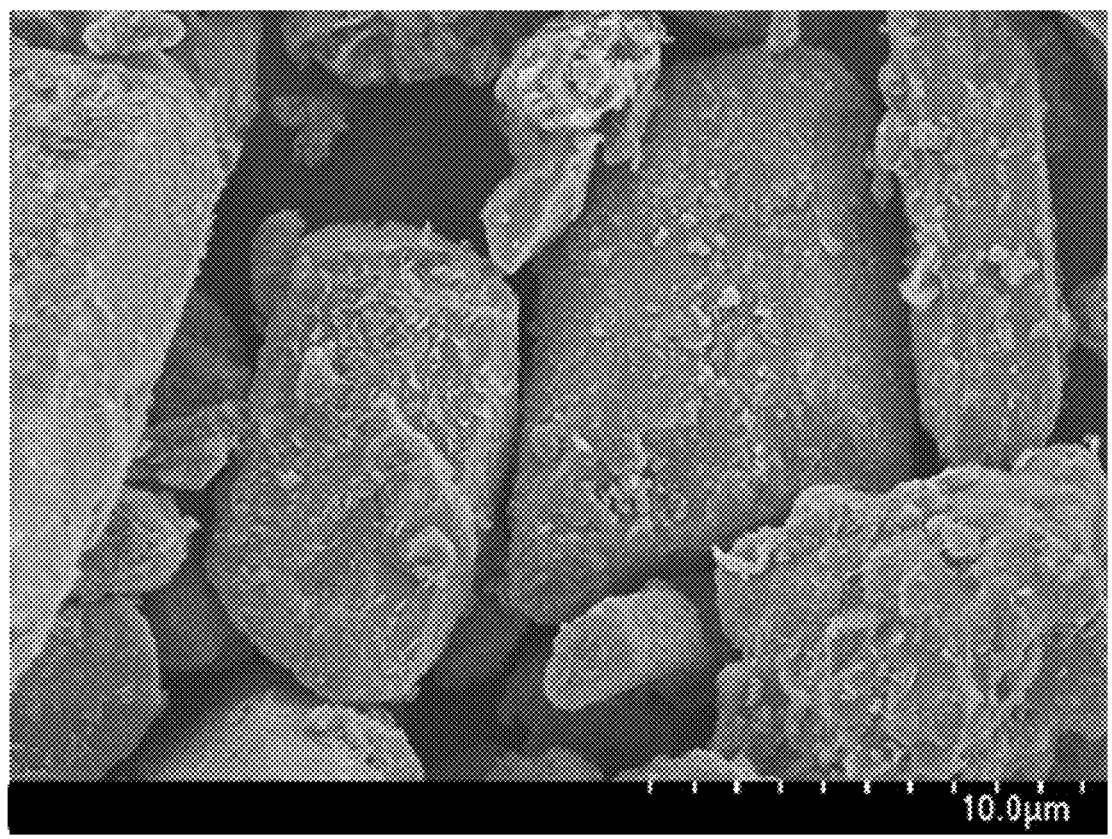
FIG. 2 is a SEM micrograph of the nitride fluorescent material of Example 1.
Figure 3:
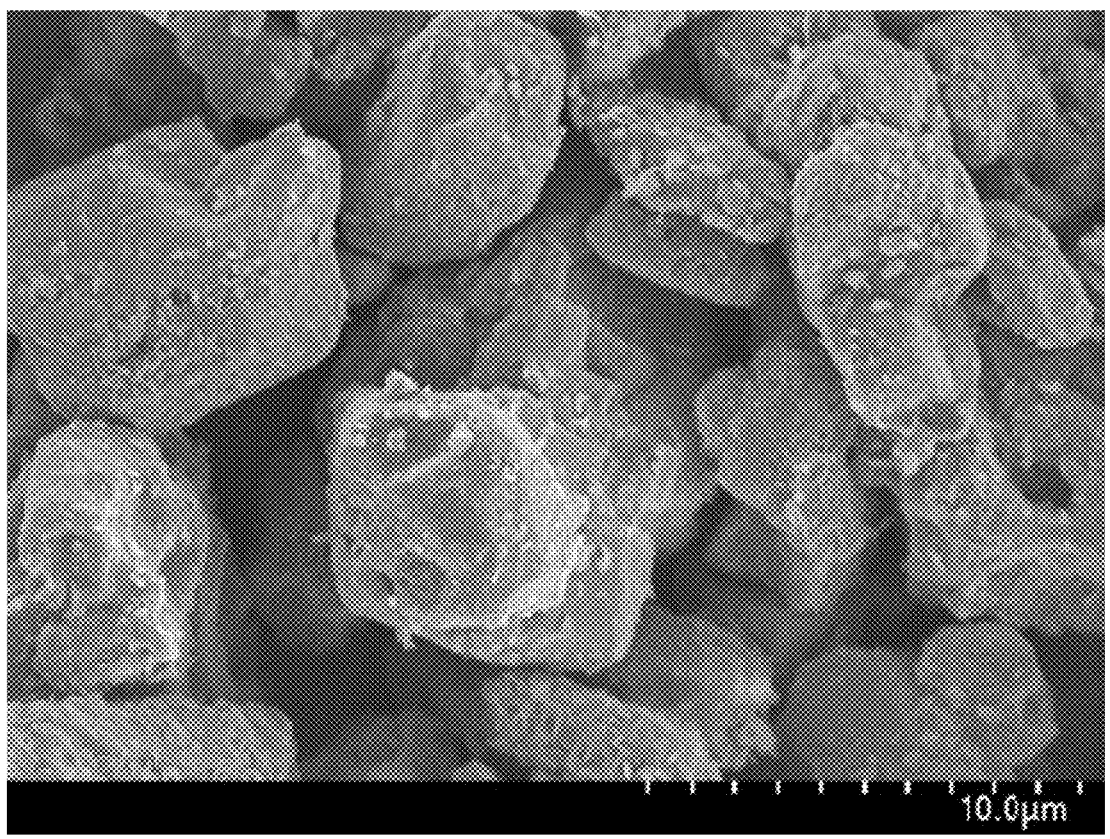
FIG. 3 is a SEM micrograph of the nitride fluorescent material of Comparative Example 1.
Figure 4:
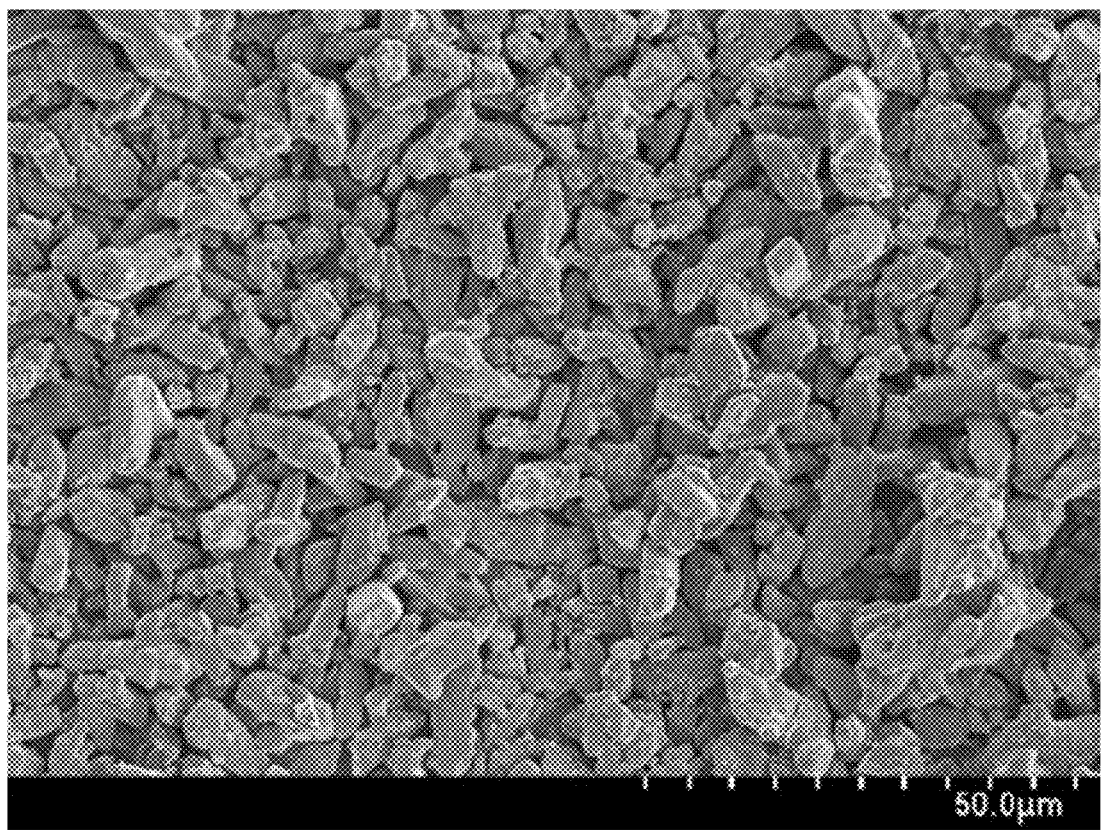
FIG. 4 is a SEM micrograph of the nitride fluorescent material of Example 1.
Figure 5:
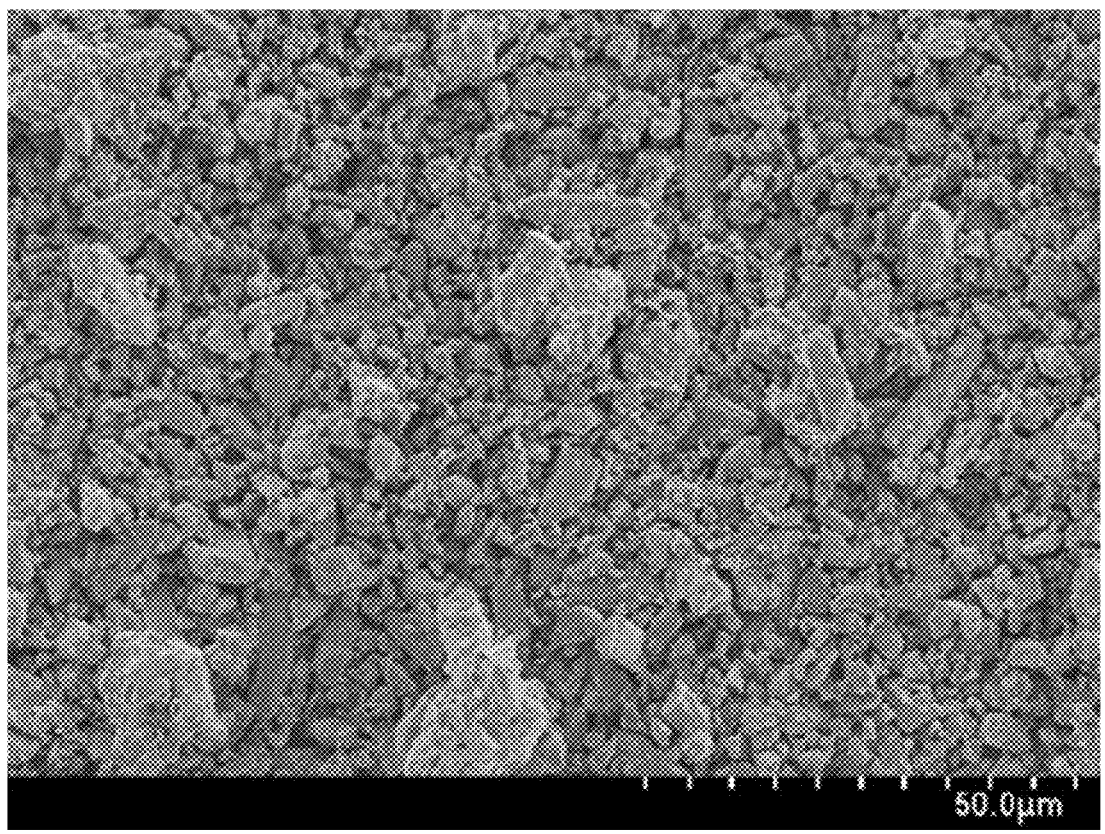
FIG. 5 is a SEM micrograph of the nitride fluorescent material of Comparative Example 6.

Using a scanning electron microscope (SEM), SEM micrographs of the nitride fluorescent materials of Example 1, Comparative Example 1 and Comparative Example 6 were taken. FIG. 2 is a SEM micrograph of the nitride fluorescent material of Example 1, and FIG. 3 is a SEM micrograph of the nitride fluorescent material of Comparative Example 1. FIG. 4 is a SEM micrograph of the nitride fluorescent material of Example 1, in which a site different from that in FIG. 2 was taken at a different magnification power, and FIG. 5 is a SEM micrograph of the nitride fluorescent material of Comparative Example 6 taken at the same magnification power as that for FIG. 4.

TABLE 1

| | Raw Material | | | | Flux | | Average Particle Diameter (D50) (μm) | Relative Emission Intensity Ip (%) |
|---|---|---|---|---|---|---|---|---|
| | Sr raw material | Li raw material | Eu raw material | Al raw material | Compound | Amount added (mass %) | | |
| Example 1 | SrN$_u$ (u = 2/3) | LiAlH$_4$ | EuF$_3$ | AlN | SrF$_2$ | 5.0 | 11.2 | 107 |
| Example 2 | | | | | | 10.0 | 11.6 | 111 |
| Example 3 | | | | | LiF | 5.0 | 10.6 | 103 |
| Example 4 | | | | | | 10.0 | 9.9 | 105 |
| Example 5 | | LiH | | | | 5.0 | 8.2 | 104 |
| Example 6 | | | | | | 10.0 | 7.3 | 107 |
| Example 7 | | | | | | 15.0 | 9.2 | 108 |
| Comparative Example 1 | | LiAlH$_4$ | | | — | 0.0 | 10.3 | 100 |
| Comparative Example 2 | | LiH | | | — | 0.0 | 6.5 | 89 |
| Comparative Example 3 | | | | | SrF$_2$ | 2.5 | 7.9 | 95 |
| Comparative Example 4 | | | | | SrCl$_2$ | 5.0 | 9.5 | 98 |
| Comparative Example 5 | | | | | LiCl | 5.0 | 9.4 | 99 |
| Comparative Example 6 | | | | | LiF | 20.0 | 7.3 | 105 |
| Comparative Example 7 | | | | | BaF$_2$ | 5.0 | 7.1 | 97 |
| Comparative Example 8 | | | | | CaF$_2$ | 5.0 | 7.3 | 85 |

TABLE 2

| | Analytical Compositional Ratio (molar ratio) | | | | |
|---|---|---|---|---|---|
| | Sr | Li | Eu | Al | N |
| Example 1 | 0.996 | 0.940 | 0.007 | 3.000 | 3.682 |
| Example 2 | 1.005 | 0.948 | 0.007 | 3.000 | 3.685 |
| Example 3 | 0.964 | 0.983 | 0.007 | 3.000 | 2.545 |
| Example 4 | 0.956 | 0.944 | 0.007 | 3.000 | 2.408 |
| Example 5 | 0.997 | 1.166 | 0.008 | 3.000 | 3.105 |
| Example 6 | 0.969 | 1.774 | 0.009 | 3.000 | 3.293 |
| Example 7 | 0.988 | 1.582 | 0.008 | 3.000 | 3.496 |
| Comparative Example 1 | 1.006 | 1.004 | 0.006 | 3.000 | 3.801 |

TABLE 2-continued

| | Analytical Compositional Ratio (molar ratio) | | | | |
|---|---|---|---|---|---|
| | Sr | Li | Eu | Al | N |
| Comparative Example 2 | 1.020 | 1.010 | 0.007 | 3.000 | 2.838 |
| Comparative Example 3 | 1.044 | 1.014 | 0.007 | 3.000 | 2.988 |
| Comparative Example 4 | 1.084 | 0.990 | 0.006 | 3.000 | 3.600 |
| Comparative Example 5 | 1.094 | 0.984 | 0.006 | 3.000 | 3.616 |
| Comparative Example 6 | 1.038 | 1.555 | 0.009 | 3.000 | 2.700 |
| Comparative Example 7 | 0.997 | 0.999 | 0.007 | 3.000 | 3.475 |
| Comparative Example 8 | 0.966 | 1.041 | 0.007 | 3.000 | 3.665 |

As shown in Table 1, the nitride fluorescent materials of Examples 1 to 7 where $SrF_2$ or LiF was used as the flux have a relative emission intensity of more than 100% based on Comparative Example 1. From these results, it is known that the nitride fluorescent materials of Examples 1 to 7 have a higher emission intensity than before. Among these Examples, Examples 1 and 2 are compared with Examples 3 and 4. As shown in Table 1, the relative emission intensity is higher in Examples 1 and 2 using $SrF_2$ as the flux than that in Examples 3 and 4 using LiF as the flux. Examples 3 and 4 are compared with Examples 5 and 6. As shown in Table 1, the relative emission intensity is somewhat higher in Examples 5 and 6 using LiH as the Li raw material than that in Examples 3 and 4 using $LiAlH_4$ as the Li raw material. Examples 5, 6 and 7 are compared with each other. As the amount of LiF added increases, the relative emission intensity becomes higher.

The nitride fluorescent materials of Examples 1 to 7 had an emission peak wavelength in the emission spectrum of around 650 nm, and the full width at half maximum thereof was around 50 nm.

As shown in Table 2, the nitride fluorescent materials of Examples and Comparative Examples each had, as a result of composition analysis, the composition represented by the formula (I).

As shown in Table 1, the nitride fluorescent materials of Comparative Example 1 and Comparative Example 2 not using a flux had a lower relative emission intensity than the nitride fluorescent materials of Examples 1 to 7 using $SrF_2$ or LiF as the flux. Even in the case of using a flux, the nitride fluorescent material of Comparative Example 3 in which the amount of $SrF_2$ added was 2.5% by mass, that is, the amount was smaller than that in Examples had a low relative emission intensity. The nitride fluorescent material of Comparative Example 6, in which LiF as the flux was added in an amount of 20% by mass that was larger than that in Examples, had a higher relative emission intensity than that of Comparative Example 1. But in the nitride fluorescent material of Comparative Example 6, the particles fused together to be in a sintered state, and as shown in FIG. 5, after ground, fine particles and coarse particles like broken debris mixed together and the particle size greatly fluctuated. On the other hand, the nitride fluorescent material of Example 1 did not show significant particle size fluctuation. See FIG. 4. The nitride fluorescent materials of Comparative Example 4 and Comparative Example 5 where a Sr or Li chloride was used as the flux had a low relative emission intensity. Further, the nitride fluorescent materials of Comparative Example 7 where $BaF_2$ was used as the flux and Comparative Example 8 where $CaCl_2$ was used as the flux also had a low relative emission intensity. Though not clear, the reason why the relative emission intensity of these materials was low may be considered because of the probability of the difference in the melting point between the compounds contained in the raw materials and of the difference in the reactivity therebetween, and as a result, the compounds in the raw materials could not be reacted uniformly and the crystallinity of the nitride fluorescent materials could decrease.

As shown in FIG. 1, the relative emission intensity of the nitride fluorescent materials of Example 1 and Example 2 is higher than the relative emission intensity of the nitride fluorescent material of Comparative Example 1. The emission peak wavelength and the peak profile of the nitride fluorescent materials of Example 1 and Example 2 are nearly the same as those of the nitride fluorescent material of Comparative Example 1. In addition, the nitride fluorescent material of Example 1 shown in FIG. 2 was, in appearance, nearly the same as the nitride fluorescent material of Comparative Example 1 shown in FIG. 3. From these, it is presumed that the crystal structure of the nitride fluorescent materials of Example 1 and Example 2 did not change according to the method of the present Examples, and the crystal structure was stable.

According to the production method of the present disclosure, there can be obtained a nitride fluorescent material having a higher emission intensity. The light emitting device using the nitride fluorescent material is favorably used as a light source for lightings, etc. In particular, the material is favorably usable in a light source for lightings, LED displays, liquid-crystal backlight sources and the like using a light emitting diode as an excitation light source and having extremely excellent emission properties.

The invention claimed is:
1. A method of producing a nitride fluorescent material having a composition containing at least one element $M^a$ selected from the group consisting of Sr, Ca, Ba and Mg, at least one element $M^b$ selected from the group consisting of Li, Na and K, at least one element $M^c$ selected from the group consisting of Eu, Ce, Tb and Mn, and Al and N, comprising:
  subjecting a raw material mixture containing elements constituting the composition of the nitride fluorescent material, along with $SrF_2$ and/or LiF added thereto as a flux, to a heat treatment to obtain a heat-treated product, wherein an amount of the flux is in a range of 5.0% by mass or more and 15% by mass or less relative to a total mass amount of the raw material mixture and the flux,
  wherein the heat treatment is carried out in an atmosphere containing a nitrogen gas, and a pressure for the heat treatment is in a range of 0.2 MPa or more and 200 MPa or less as a gauge pressure.
2. The method of producing a nitride fluorescent material according to claim 1, wherein the nitride fluorescent material has a composition represented by formula (I):

$$M^a{}_w M^b{}_x Eu_y Al_3 N_z \qquad (I)$$

wherein $M^a$ is at least one element selected from the group consisting of Sr, Ca, Ba, and Mg; $M^b$ is at least one element selected from the group consisting of Li, Na, and K; and w, x, y, and z each are numbers satisfying $0.8 \leq w < 1.1$, $0.5 \leq x \leq 1.8$, $0.001 < y \leq 0.1$, and $1.5 \leq z \leq 5.0$.

3. The method of producing a nitride fluorescent material according to claim 2, wherein the element $M^a$ contains at least Sr and the element $M^b$ contains at least Li.

4. The method of producing a nitride fluorescent material according to claim 1, wherein a temperature for the heat treatment is in a range of 1,000° C. or higher and 1,400° C. or lower.

5. The method of producing a nitride fluorescent material according to claim 1, wherein a temperature for the heat treatment is in a range of 1,000° C. or higher and 1,300° C. or lower.

6. The method of producing a nitride fluorescent material according to claim 1, wherein the amount of the flux is in a range of 9.0% by mass or more to a total mass amount of the raw material mixture and the flux.

7. The method of producing a nitride fluorescent material according to claim 2, wherein y and z each are numbers satisfying $0.001 < y \leq 0.02$, and $2.0 \leq z \leq 4.0$.

8. The method of producing a nitride fluorescent material according to claim 2, wherein y and z each are numbers satisfying $0.002 \leq y \leq 0.015$, and $2.0 \leq z \leq 4.0$.

9. The method of producing a nitride fluorescent material according to claim 1, wherein the raw material mixture containing a metal of Sr or a first metal compound containing at least Sr, a metal of Li or a second metal compound contains at least Li, a metal of Eu or a third compound containing Eu, and a metal of Al or a Al-containing metal compound.

10. The method of producing a nitride fluorescent material according to claim 9, wherein the first metal compound containing at least Sr is at least one selected from the group consisting of $SrN_2$, SrN, $Sr_3N_2$, $SrH_2$, $SrF_2$, an imide compound including Sr, and an amide compound including Sr, the second metal compound containing Li is at least one selected from the group consisting of $Li_3N$, $LiN_3$, LiH, and $LiAlH_4$, the third metal compound containing Eu is at least one selected from the group consisting of $Eu_2O_3$, EuN, and $EuF_3$, and the Al-containing metal compound is at least one selected from the group consisting of $AlH_3$, $AlF_3$ and $LiAlH_4$.

11. The method of producing a nitride fluorescent material according to claim 1, wherein the heat treatment is a two-stage heat treatment, wherein a first-stage heat treatment is carried out in a range of 800° C. or higher and 1,000° C. or lower, followed by gradual heating, and a second-stage heat treatment that is carried out in a range of 1,000° C. or higher and 1,400° C. or lower.

12. The method of producing a nitride fluorescent material according to claim 1, wherein a content of the nitrogen gas in the atmosphere for the heat treatment is 70% by volume or more.

13. The method of producing a nitride fluorescent material according to claim 1, wherein the pressure for the heat treatment is in a range of 0.8 MPa or more and 1.0 MPa or less as a gauge pressure.

14. The method of producing a nitride fluorescent material according to claim 1, the method further comprises grinding the heat-treated product after the heat treatment.

15. The method of producing a nitride fluorescent material according to claim 1, the method comprises subjecting the heat-treated product to classification after the heat treatment.

16. The method of producing a nitride fluorescent material according to claim 1, wherein an average particle diameter of the nitride fluorescent material is in a range of 4.0 μm or more and 30 μm or less.

17. The method of producing a nitride fluorescent material according to claim 1, wherein the nitride fluorescent material absorbs light having a wavelength range of 400 nm or more and 570 nm or less, and emits fluorescence having an emission peak wavelength in a wavelength range of 630 nm or more and 670 nm or less.

* * * * *